US008913361B2

(12) United States Patent
Li

(10) Patent No.: US 8,913,361 B2
(45) Date of Patent: Dec. 16, 2014

(54) OVERVOLTAGE PROTECTION CIRCUIT AND PORTABLE ELECTRONIC DEVICE COMPRISING SAME

(71) Applicant: Ying-Zheng Li, Shenzhen (CN)

(72) Inventor: Ying-Zheng Li, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 172 days.

(21) Appl. No.: 13/663,505

(22) Filed: Oct. 30, 2012

(65) Prior Publication Data

US 2013/0170086 A1 Jul. 4, 2013

(30) Foreign Application Priority Data

Dec. 30, 2011 (CN) ........................ 2011 1 10454552

(51) Int. Cl.
*H02H 3/20* (2006.01)

(52) U.S. Cl.
USPC ........................................................ 361/91.2

(58) Field of Classification Search
USPC ........................................................ 361/91.2
See application file for complete search history.

(56) References Cited

U.S. PATENT DOCUMENTS 5,581,170 A * 12/1996 Mammano et al. ........... 320/116
5,723,970 A * 3/1998 Bell ............................. 320/140
7,898,092 B2 * 3/2011 Lu et al. ........................ 257/777
8,344,519 B2 * 1/2013 Lu et al. ........................ 257/777
2009/0128968 A1 * 5/2009 Lu et al. .......................... 361/56
2011/0278709 A1 * 11/2011 Lu et al. ........................ 257/676
2012/0203178 A1 * 8/2012 Tverskoy ...................... 604/151
2013/0170086 A1 * 7/2013 Li ............................... 361/91.2

* cited by examiner

*Primary Examiner* — Ronald W Leja
(74) *Attorney, Agent, or Firm* — Novak Druce Connolly Bove + Quigg LLP

(57) ABSTRACT

An overvoltage protection circuit is configured to protect a battery pack from overvoltage when the battery pack is in charge. The overvoltage protection circuit includes a power supply, an overvoltage protection chip, a controller and switching circuit. The power supply is configured to charge the battery pack. The overvoltage protection chip is electronically connected between the power supply and the battery pack, the overvoltage protection chip comprising a voltage detection pin. The controller is electronically connected to the battery pack and configured to detect whether the battery pack is a high voltage type battery pack or a normal voltage type battery, and outputting corresponding control signals according to the detection. The switching circuit comprises a switch and two voltage dividing circuits, the switch connecting a corresponding voltage dividing circuit to the positive pole of the battery pack and the voltage detection pin under control of the control signal.

14 Claims, 3 Drawing Sheets

OVERVOLTAGE PROTECTION CIRCUIT AND PORTABLE ELECTRONIC DEVICE COMPRISING SAME

BACKGROUND

1. Technical Field

The exemplary disclosure generally relates to overvoltage protection circuits, particularly to an overvoltage protection circuit that protects either a normal voltage battery or a high voltage battery, and a portable electronic device comprising the overvoltage protection circuit.

2. Description of Related Art

A limited charge voltage of a high voltage type battery pack can be 4.35V, while a limited charge voltage of a normal voltage type battery pack can be 4.2V. Since the high voltage type battery and the normal voltage type battery have different limited charge voltages, the high voltage type battery and the normal voltage type battery usually have different overvoltage protection circuits. Accordingly, in use, a portable electronic device can use only one type of the high voltage type battery and the normal voltage type battery.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the disclosure.

DETAILED DESCRIPTION

Figure 1:
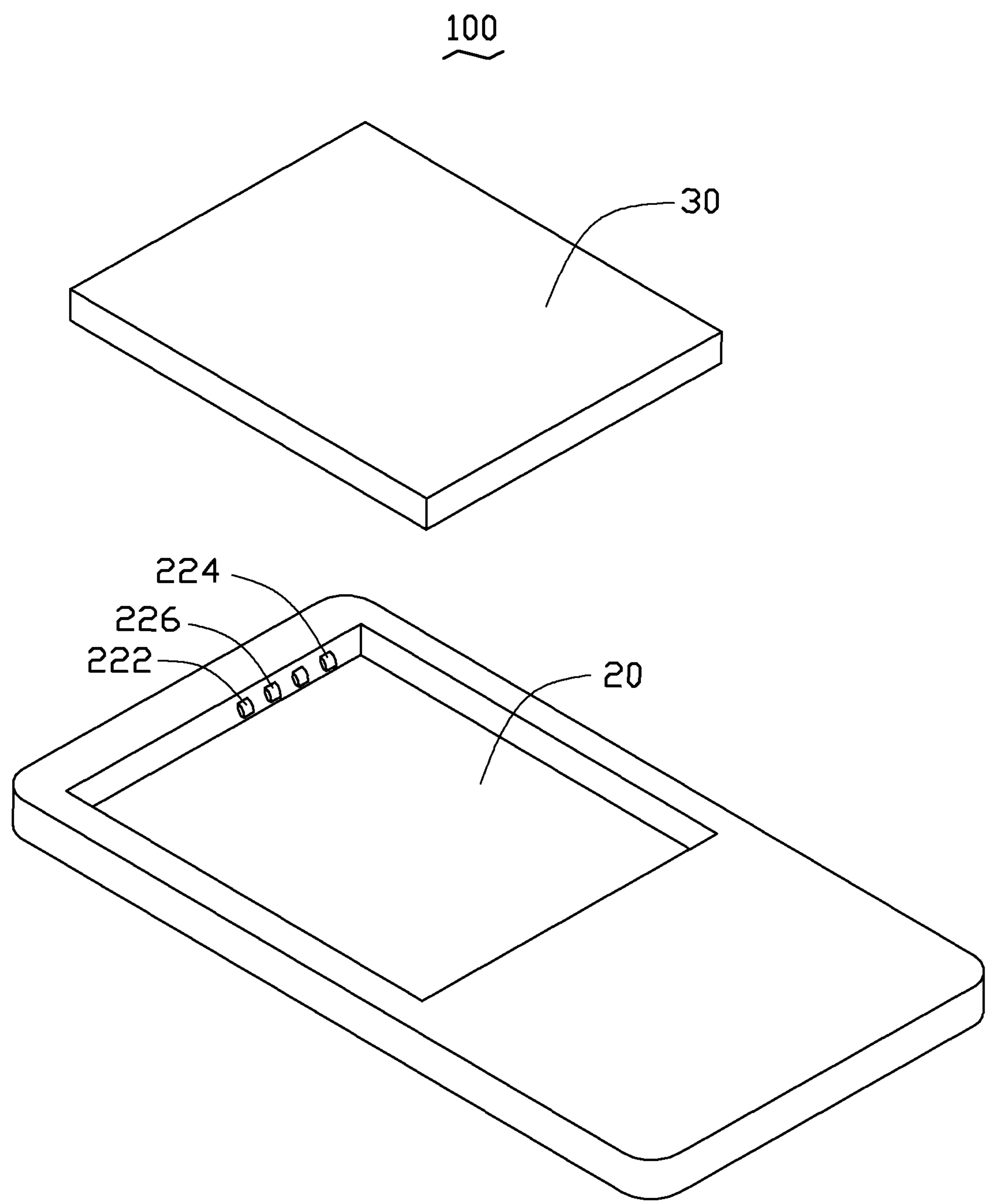
FIG. 1 shows an exploded view of an exemplary embodiment of a portable electronic device.

FIG. 1 shows an exploded view of an exemplary embodiment of a portable electronic device 100. The portable electronic device 100 defines a compartment 20 detachably receiving a battery pack 30. A positive contact 222, a negative contact 224, and a detection contact 226 are spacingly positioned in the compartment 20. The battery pack 30 comprises an identifying (ID) resistor (not shown). The battery pack 30 can be one of a high voltage type battery and a normal voltage type battery. A limited charge voltage of the high voltage type battery pack can be 4.35V, while a limited charge voltage of the normal voltage type battery pack can be 4.2V, in one example. Type of the battery pack 30 can be determined in a well-known way by detecting resistance of the ID resistor. When the battery pack 30 is received into the compartment 20, the positive contact 222 and the negative contact 224 are respectively and electronically connected to a positive pole and a negative pole of the battery pack 30, and the detection contact 226 is electronically connected to the ID resistor of the battery pack 30. The voltage of the positive contact 222 is about equal to a charging voltage of the battery pack 30.

Figure 2:
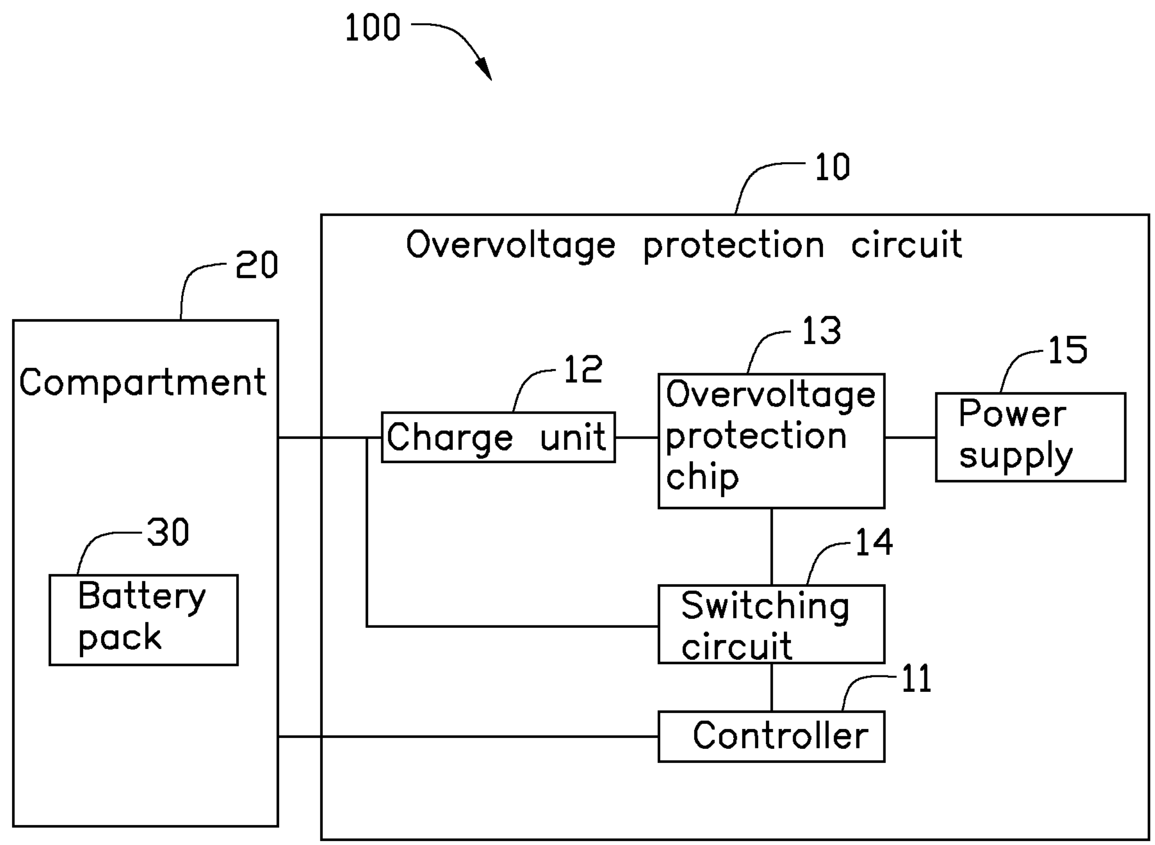
FIG. 2 shows a block diagram of the portable electronic device shown in FIG. 1 comprising an overvoltage protection circuit.

FIG. 2 shows a block diagram of the portable electronic device 100 shown in FIG. 1, comprising an overvoltage protection circuit 10. The overvoltage protection circuit 10 determines the type of the battery pack 30 received in the compartment 20, and protects the battery pack 30 from overvoltage damage according to the type of the battery pack 30 when the battery pack 30 is in charge. The overvoltage protection circuit 10 includes a controller 11, a charge unit 12, an overvoltage protection chip 13, a switching circuit 14, and a power supply 15.

Figure 3:
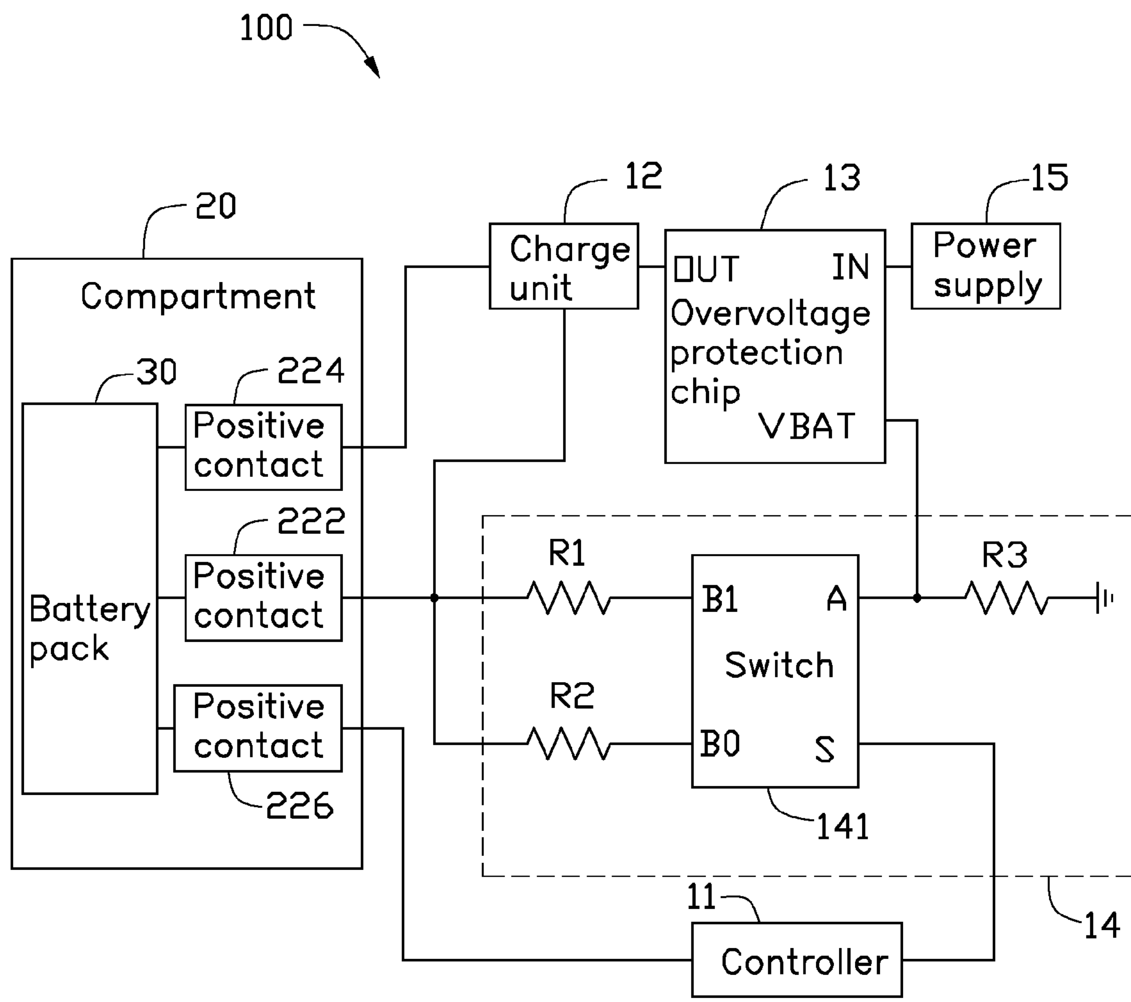
FIG. 3 shows a schematic circuit diagram of the portable electronic device shown in FIG. 2.

FIG. 3 shows a schematic circuit diagram of the portable electronic device shown in FIG. 2. The controller 11 determines whether the battery pack 30 is a high voltage type battery or a normal voltage type battery, and outputs corresponding control signals to the switching circuit 14 according to the determination. In the exemplary embodiment, the controller 11 is electronically connected to the detection contact 226, such that the controller 11 is electronically connected to the ID resistor of the battery pack 30, to determine whether the battery pack 30 is the high voltage type battery or the normal voltage type battery by detecting the resistance of the ID resistor of the battery pack 30. The controller 11 outputs a first level voltage signal, such as a logic 1 signal, for example, as the control signal to the switching circuit 14 when the battery pack 30 is a high voltage type battery. Alternatively, the controller 11 outputs a second level voltage signal, such as a logic 0 signal, for example, as the control signal to the switching circuit 14 when the battery pack 30 is a low voltage type battery.

The charge unit 12 is electronically connected to the positive contact 222 of the compartment 20, the negative contact 224 of the compartment 20, and the power supply 15. The charge unit 12 converts a source voltage outputted from the power supply 15 to an appropriate charge voltage to charge the battery pack 30 via the positive and negative contacts 222 and 224.

The overvoltage protection chip 13 is electronically connected to the power supply 15, the charge unit 12, and the switching circuit 14. The overvoltage protection chip 13 protects the battery pack 30 from overvoltage when the battery pack 30 is charged by the power supply 15 via the charge unit 12. The overvoltage protection chip 13 includes an input pin IN electronically connected to the power supply 15, an output pin OUT electronically connected to the charge unit 12, and a voltage detection pin VBAT electronically connected to the switching circuit 14. When the voltage of the voltage detection pin VBAT is lower than a predetermined reference voltage, the overvoltage protection chip 13 enables an electronic connection between the input pin IN and the output pin OUT, such that the power supply 15 outputs a charge power source to the charge the battery pack 30 via the overvoltage protection chip 13 and the charge unit 12. When the voltage of the voltage detection pin VBAT is higher than the predetermined reference voltage, the overvoltage protection chip 13 disconnects the input pin IN from the output pin OUT, thereby disconnecting the power supply 15 from the charge unit 12, such that the charge unit 12 stops charging the battery pack 30.

The switching circuit 14 selectively connects a corresponding voltage dividing circuit between the positive contact 222 and the voltage detection pin VBAT according to the control signal. The output voltage of the voltage dividing circuit output to the voltage detection pin VBAT increases with the increase of the voltage of the positive pole of the battery pack 30. The output voltage of the voltage dividing circuit output to the voltage detection pin VBAT is higher than the predetermined reference voltage, when the voltage of the positive pole of the battery pack 30 is higher than a limited charge voltage of the battery pack 30.

In the exemplary embodiment, the switching circuit 14 includes a switch 141, a first voltage dividing resistor R1, a second voltage dividing resistor R2, and a third voltage dividing resistor R3. The switch 141 is a single pole double throw (SPDT) switch, which includes a control terminal S electronically connected to the controller 11, a switching terminal A electronically connected to the voltage detection pin VBAT of the overvoltage protection chip 12, a first connection terminal B1 electronically connected to the positive contact 222 via the first voltage dividing resistor R1, and a second connection terminal B0 electronically connected to the positive contact 222 via the second voltage dividing resistor R2. A node between the switching terminal A and the voltage detection pin VBAT is grounded via the third voltage dividing resistor R3. The switch 141 selectively connects the switching terminal A to one of the first connection terminal B1 and the second connection terminal B0 under the control of the controller 11, thereby connects different voltage dividing circuits between the positive contact 222 and the voltage detection pin VBAT.

For example, the controller 11 outputs the first level signal as the control signal to the switch 141 when the controller 11 detects the battery pack 30 is the high voltage type battery, to control the switch 141 connects the switch terminal A to the first connection terminal B1. At this time, the first and third voltage dividing resistors R1 and R3 forms a voltage dividing circuit to divide the charge voltage of the high voltage type battery pack 30, the voltage of the voltage detection pin VBAT is a divided voltage of the charge voltage of the high voltage type battery pack 30. The first and third voltage dividing resistors R1 and R3 are adjusted to ensure that the voltage of the voltage detection pin VBAT is higher than the predetermined reference voltage when the charge voltage of the high voltage type battery pack 30 is higher than the limited charge voltage (e.g. 4.35V) of the high voltage type battery pack 30. At this time, the overvoltage protection circuit 13 disconnects the high voltage type battery pack 30 from the power supply 15 to protect the high voltage type battery pack 30 from overvoltage.

Alternatively, the controller 11 outputs the second level signal as the control signal to the switch 141 when the controller 11 detects the battery pack 30 is the normal voltage type battery, to control the switch 141 connects the switch terminal A to the second connection terminal B0. At this time, the second and third voltage dividing resistors R2 and R3 forms another voltage dividing circuit to divide the charge voltage of the normal voltage type battery pack 30, the voltage of the voltage detection pin VBAT is a divided voltage of the charge voltage of the normal voltage type battery pack 30. The second and third voltage dividing resistors R2 and R3 are adjusted to ensure that the voltage of the voltage detection pin VBAT is higher than the predetermined reference voltage when the charge voltage of the normal voltage type battery pack 30 is higher than the limited charge voltage (e.g. 4.2V) of the normal voltage type battery pack 30. At this time, the overvoltage protection circuit 13 disconnects the normal voltage type battery pack 30 from the power supply 15 to protect the normal voltage type battery pack 30 from overvoltage.

In other words, the controller 11 detects the type of the battery pack 30, and controls the activity of the switch 141 according to the type of the battery pack 30, to connect different voltage dividing circuits to the positive pole of the battery pack 30 to divide the charge voltage of the battery pack 30, such that, the overvoltage protection circuit 10 can protect both of the high voltage type battery pack and the normal voltage type battery pack from overvoltage damage. Hence, the overvoltage protection circuit 10 has a good generality, and the electronic device 100 comprising the overvoltage protection circuit 10 can use both of the high voltage type battery pack and the normal voltage type battery pack.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An overvoltage protection circuit, configured to protect a battery pack from overvoltage when the battery pack is in charge, comprising:

a power supply configured to charge the battery pack;

an overvoltage protection chip electronically connected between the power supply and the battery pack, the overvoltage protection chip comprising a voltage detection pin, the over voltage protection chip disconnecting the battery pack from the power supply when the voltage of the voltage detection pin is higher than a predetermined voltage;

a controller electronically connected to the battery pack, the controller detecting whether the battery pack is a high voltage type battery pack or a normal voltage type battery, and outputting corresponding control signals according to the detection;

a switching circuit comprising a switch and two voltage dividing circuits, the switch connecting a corresponding voltage dividing circuit to a positive pole of the battery pack and the voltage detection pin under control of the control signal;

wherein when each of the voltage dividing circuits is connected between the positive pole of the battery pack and the voltage detection pin, the voltage dividing circuit outputs a divided voltage of the positive pole of the battery pack to the voltage detection pin.

2. The overvoltage protection circuit of claim 1, wherein the switching circuit further comprises a first voltage dividing resistor, a second voltage dividing resistor, and a third voltage dividing resistor, the switch comprises a control terminal electronically connected to the controller, a switching terminal electronically connected to the voltage detection pin, a first connection pin electronically connected to the positive pole of the battery pack via the first voltage dividing resistor, and a second connection pin electronically connected to the positive pole of the battery pack via the second voltage dividing resistor, a node between the switching terminal and the voltage detection is grounded via the third voltage dividing resistor.

3. The overvoltage protection circuit of claim 2, wherein the switch selectively connects the switching terminal to one of the first connection terminal and the second connection terminal at the control of the controller; the first and third voltage dividing resistors form one voltage dividing circuit when the switching terminal of the switch is connected to the first connection terminal, and the second and third voltage dividing resistors form another voltage dividing circuit when the switching terminal of the switch is connected to the second connection terminal.

4. The overvoltage protection circuit of claim 2, wherein the switch is a single pole double throw switch.

5. The overvoltage protection circuit of claim 3, wherein the controller outputs a first level voltage signal to the control terminal when the controller detects the battery pack is the high voltage type battery pack, and the controller outputs a second level voltage signal to the control terminal when the controller detects the battery pack is the normal voltage type battery pack.

6. The overvoltage protection circuit of claim 1, wherein the controller electronically connected to an identifying resistor of the battery pack, the controller determines whether the battery pack is the high voltage type battery or the normal voltage type battery by detecting resistance of the identifying resistor.

7. The overvoltage protection circuit of claim 1, further comprising a charge unit electronically connected to both of the positive and negative poles of the battery pack, the charge unit further electronically connected to the power supply via the overvoltage protection chip, the charge unit converts a source voltage outputted from the power supply to an appropriate charge voltage to charge the battery pack.

8. A portable electronic device, comprising:

a compartment configured to receive a battery pack, the compartment comprising a positive contact electronically connected to a positive pole of the battery pack;

a power supply configured to charge the battery pack via the positive contact;

an overvoltage protection circuit configured to protect the battery pack from overvoltage damage when the battery pack is charged by the power supply, the overvoltage protection circuit comprising:

an overvoltage protection chip electronically connected between the power supply and the positive contact of the compartment, the overvoltage protection chip comprising a voltage detection pin, the over voltage protection disconnecting the positive contact from the power supply when the voltage of the voltage detection pin is higher than a predetermined voltage;

a controller electronically connected to the battery pack, the controller detecting whether the battery pack is a high voltage type battery pack or a normal voltage type battery, and outputting corresponding control signals according to the detection;

a switching circuit comprising a switch and two voltage dividing circuits, the switch connecting a corresponding voltage dividing circuit to the positive contact of the compartment and the voltage detection pin under control of the control signal;

wherein when each of the voltage dividing circuits is connected between the positive contact of the compartment and the voltage detection pin, the voltage dividing circuit outputs a divided voltage of the positive pole of the battery pack to the voltage detection pin.

9. The portable electronically device of claim 8, wherein the switching circuit further comprises a first voltage dividing resistor, a second voltage dividing resistor, and a third voltage dividing resistor, the switch comprises a control terminal electronically connected to the controller, a switching terminal electronically connected to the voltage detection pin, a first connection pin electronically connected to the positive contact via the first voltage dividing resistor, and a second connection pin electronically connected to the positive contact via the second voltage dividing resistor, a node between the switching terminal and the voltage detection is grounded via the third voltage dividing resistor.

10. The portable electronically device of claim 9, wherein the switch selectively connects the switching terminal to one of the first connection terminal and the second connection terminal at the control of the controller; the first and third voltage dividing resistors form one voltage dividing circuit when the switching terminal of the switch is connected to the first connection terminal, and the second and third voltage dividing resistors form another voltage dividing circuit when the switching terminal of the switch is connected to the second connection terminal.

11. The portable electronically device of claim 9, wherein the switch is a single pole double throw switch.

12. The portable electronically device of claim 10, wherein the controller outputs a first level voltage signal to the control terminal when the controller detects the battery pack is the high voltage type battery pack, and the controller outputs a second level voltage signal to the control terminal when the controller detects the battery pack is the normal voltage type battery pack.

13. The portable electronically device of claim 8, wherein the compartment further comprises a detection contact electronically connected to the controller and an identifying resistor of the battery pack, the controller determines whether the battery pack is the high voltage type battery or the normal voltage type battery by detecting resistance of the identifying resistor.

14. The portable electronically device of claim 8, wherein the compartment further comprises a negative pole, the overvoltage protection circuit further comprising a charge unit electronically connected to both of the positive and negative contacts of the compartment, the charge unit further electronically connected to the power supply via the overvoltage protection chip, the charge unit converts a source voltage outputted from the power supply to an appropriate charge voltage to charge the battery pack.

* * * * *